United States Patent [19]

Ballard, Jr. et al.

[11] Patent Number: 5,305,287
[45] Date of Patent: Apr. 19, 1994

[54] HIGH-FREQUENCY BOREHOLE SEISMIC SOURCE

[75] Inventors: Robert F. Ballard, Jr., Clinton, Miss.; Richard D. Rechtien; Kurt L. Hambacker, both of Rolla, Mo.

[73] Assignee: The United States of America as represented by the Secretary of the Army, Washington, D.C.

[21] Appl. No.: 963,363

[22] Filed: Oct. 20, 1992

[51] Int. Cl.⁵ .............................................. G01V 1/157
[52] U.S. Cl. ..................................... 367/147; 181/113
[58] Field of Search ................. 181/106, 113; 367/147, 367/171; 313/172, 232

[56] References Cited

U.S. PATENT DOCUMENTS

| | | | |
|---|---|---|---|
| 2,887,604 | 5/1959 | Bodine, Jr. et al. | 313/232 |
| 3,428,940 | 2/1969 | Huckabay | 367/147 |
| 4,105,993 | 8/1978 | Grassy et al. | 367/27 |

FOREIGN PATENT DOCUMENTS 607167  5/1976  U.S.S.R. ............................ 367/147

Primary Examiner—Ian J. Lobo
Attorney, Agent, or Firm—Luther A. Marsh

[57] ABSTRACT

An acoustic source for seismic exploration has a generally cylindrical tube with spaced upper and lower closed ends. An insulated continuous conductor has a first portion with an exposed internal conductive end within the tube and a second portion extending therefrom through the upper end. A selectively closeable port is operably associated with the tube for permitting the tube to be filled and maintained filled with a conductive solution. A gas vent has a first open end within the tube adjacent the upper end and a second end exteriorly disposed of the tube.

20 Claims, 3 Drawing Sheets

HIGH-FREQUENCY BOREHOLE SEISMIC SOURCE

FIELD OF THE INVENTION

The disclosed invention is directed to an arc discharge device for seismic data gathering.

BACKGROUND OF THE INVENTION

Recent interest in high-resolution tomography has stimulated interest in high-frequency short wavelength energy sources. Two general types of transducers have emerged, one employing piezoelectric principles and the other electric arc discharge principles. Regardless of type, these prior transducers are relatively expensive to manufacture, frequently application specific, and lack a repeatable seismic signature in all geologic settings.

Piezoelectric transducers transmitting a continuous signal in a frequency band of 300 to 2,500 Hz. at an acoustic power of 10 W have been deployed in a manner similar to that of vibrator style surface seismology. Cross-well seismic measurements in sedimentary rocks have been employed, particularly when a piezoelectric cylindrical bender bar transducer operating with gated sinusoidal pulses has been used.

Arc discharge transducers capable of generating pulse signals having dominant frequencies within the 1–2 kHz. range with sufficient energy to allow pulse signal detection at distances of 300 meters or more in relatively low quality rock are known. High-frequency arc discharge devices have principally been used for sub-bottom profiling, although borehole versions of marine sparking devices are known.

One problem with prior seismic sources has been the cost of the equipment, which may be excessive in the event the transducer cannot be retrieved from the borehole. In that event, the transducer is lost and all its costs wasted. Yet another problem is the fact that these seismic sources are generally application specific, so that each is custom engineered and therefore essentially not useable in some other borehole.

Those skilled in the art will appreciate that there is a need for a high-frequency borehole seismic source which is relatively inexpensive to manufacture so that loss in a borehole is tolerable, the source is not application specific so that a single unit may be used in any number of boreholes, and the source has excellent repeatability of seismic signature in a variety of geologic settings. The disclosed invention meets these criteria in a device which may be manufactured and assembled from commercially available components which are relatively inexpensive.

OBJECTS AND SUMMARY OF THE INVENTION

The primary object of the disclosed invention is to provide a high-frequency borehole seismic source which has excellent repeatability of seismic signature in a variety of geologic settings, is inexpensive to manufacture, and is not application specific.

An acoustic source for seismic exploration comprises a generally cylindrical tube having spaced upper and lower closed ends. An insulated continuous conductor has a first arc producing portion with an exposed internal conductive end within the tube and a second portion extending therefrom through the upper end. A selectively closeable port is operably associated with the tube for permitting the tube to be filled and maintained filled with a conductive solution. A gas vent has a first open end within the tube adjacent the upper end and a second open end exteriorly disposed of the tube.

A source for acoustic seismic exploration comprises a resilient cylindrical tube having closed upper and lower ends. A continuous coaxial cable has a first arc producing portion passing through the upper end and terminates in an exposed conductive end adjacent the lower end. A resilient vent tube has a first open end adjacent the upper end and a second open end disposed exteriorly of the cylindrical tube and below the lower end. A conductive fluid fills the cylindrical tube. Means are operatively associated with the cable for supplying electrical energy thereto.

These and other features and advantages of the invention will be readily apparent in view of the following description and drawings of the above described invention.

DESCRIPTION OF THE DRAWINGS

The above and other objects and advantages and novel features of the present invention will become apparent from the following detailed description of the preferred embodiment of the invention illustrated in the accompanying drawings, wherein.

DETAILED DESCRIPTION OF THE INVENTION

Figure 1:
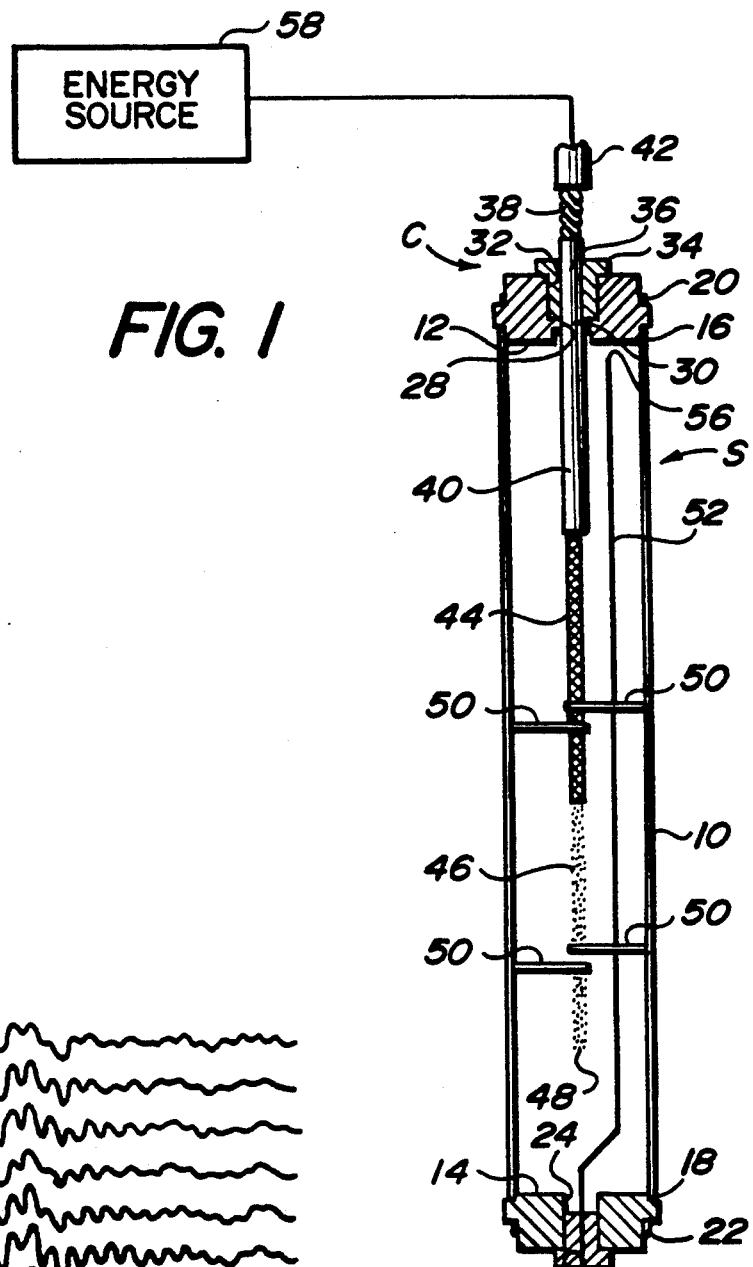
FIG. 1 is an elevational view, partially in section, of the high-frequency borehole seismic source of the invention.

Source S, as best shown in FIG. 1, has a generally cylindrical resilient outer tube 10, manufactured from commercially available polymer reinforced radiator hose or other commercially available hose that is nonconductive. Tube 10 has compression washers 12 and 14 at its upper and lower ends 16 and 18, respectively. Washers 12 and 14 are secured within the interior of tube 10 by hose clamps 20 and 22, respectively, so that the ends 16 and 18 are closed and tube 10 thereby provides a defined internal volume.

Washer 14 has a central aperture 24 in which fill port 26 is selectively positioned for closing aperture 24. Similarly, washer 12 has a central aperture 28 formed in section 30. A larger diameter aperture 32 is centrally disposed relative to the aperture 28 and similarly is selectively closed by filling port 34. The ports 26 and 34 may be threadedly engaged within their respective apertures, or they may be formed from a resilient material in order to be force fit into the respective apertures.

Coaxial cable C extends from the surface to the source S for supplying the electrical energy used for creating the acoustic wave generated by source S. We prefer that the coaxial cable be RG-8/U cable, which is commercially available. The coaxial cable C passes through the aperture 36 within port 34 and through the aperture 28 into the interior of source S. Coaxial cable, as those skilled in the art will appreciate, has a plurality of coaxial layers, typically an internal conductive layer, an insulator layer thereabout, a braided metal shield layer thereabout, and a surrounding outer plastic cover. We have found that the commercially available coaxial cable should have a metal mesh 38 about the plastic cover 40, in order to provide increased wear resistance as the source S is raised and lowered within boreholes. We also prefer that the metal mesh layer 38 have a layer of neoprene 42 overlaid thereon in order to enhance the safety of the operator.

Plastic layer 40 of cable C is stripped away in order to expose the underlying metal braided shield layer 44. Braided metal shield layer 44 similarly is stripped away in order to expose the underlying insulator layer 46. The coaxial cable C terminates adjacent washer 14, with the copper conductor layer 48 being terminated essentially coextensive with the termination of the insulator 46 in order to limit the exposed surface of the conductor 48 to its cross-sectional area.

In order to maintain proper electric field intensities for arc production between the exposed braided shield layer 44 and the exposed surface of the copper conductor 48, then we provide cable ties 50 within the tube 10 and engaged with the braided shield layer 44 and the insulator 46. The cable ties 50, in cooperation with the central positioning of the plastic cover 40 by virtue of the apertures 28 and 36, thereby maintain central alignment of the arc producing portion of the coaxial cable C within the source S.

In order to create an arc with source S, then it is necessary to create a flow path for the electrical energy between the exposed conductor end surface 48 and the exposed metal braided shield layer 44. We have found that an appropriate conductive fluid may be obtained by use of a solution of sodium chloride and water. Fifty grams of ordinary table salt per liter of water were used in testing source S, and we found that the strength and character of the seismic events generated by the source S showed no significant sensitivity to changes in salt concentration. Therefore, the source S should be filled with the salt solution through the aperture 24, after which the filling port 26 closes the aperture 24 in order to maintain the solution within the interior of tube 10.

Those skilled in the art will understand that an arc discharge device will cause the conductive fluid to be broken down into its constituents, thereby generating vapor which will naturally rise toward the upper end 16. We provide a vent tube 52 within the source S for substantially removing the generated gases from the source S, and thereby preventing those gases from achieving either an explosive concentration or a pressure which could cause the ports 26 or 34 to be expelled. Vent tube 52 preferably is Teflon tubing or the like, and has a first open end adjacent the washer 12 and a second end disposed exteriorly of the source S below washer 14. Aperture 54 within port 26 provides a convenient exit path for the lower end of the vent tube 52, where a snug fit can be easily accomplished. Because the source S is normally positioned within a borehole filled with a fluid, then we need not be overly concerned that the conductive fluid will exit the source S through the tube 52 because the upper end 56 of the tube 52 is closely adjacent the washer 12 and hydrostatic pressure will prevent the conductive fluid from leaking or being siphoned. Some amount of borehole fluid may, however, enter the source S through the tube 52, but because the salt concentration of the fluid is not critical, then that does not create a substantial problem.

In order to cause sparking between the copper conductor 48 and the braided shield 44, then it is necessary to supply electrical energy to the source S. We have found that an appropriate energy source is an EG&G model 234. The energy source 58 is connected to the acoustic source S via approximately 600 meters of armored coaxial cable C, as best shown in FIG. 1. The electrical circuitry for the source 58 is best shown in FIG. 2.

Figure 2:
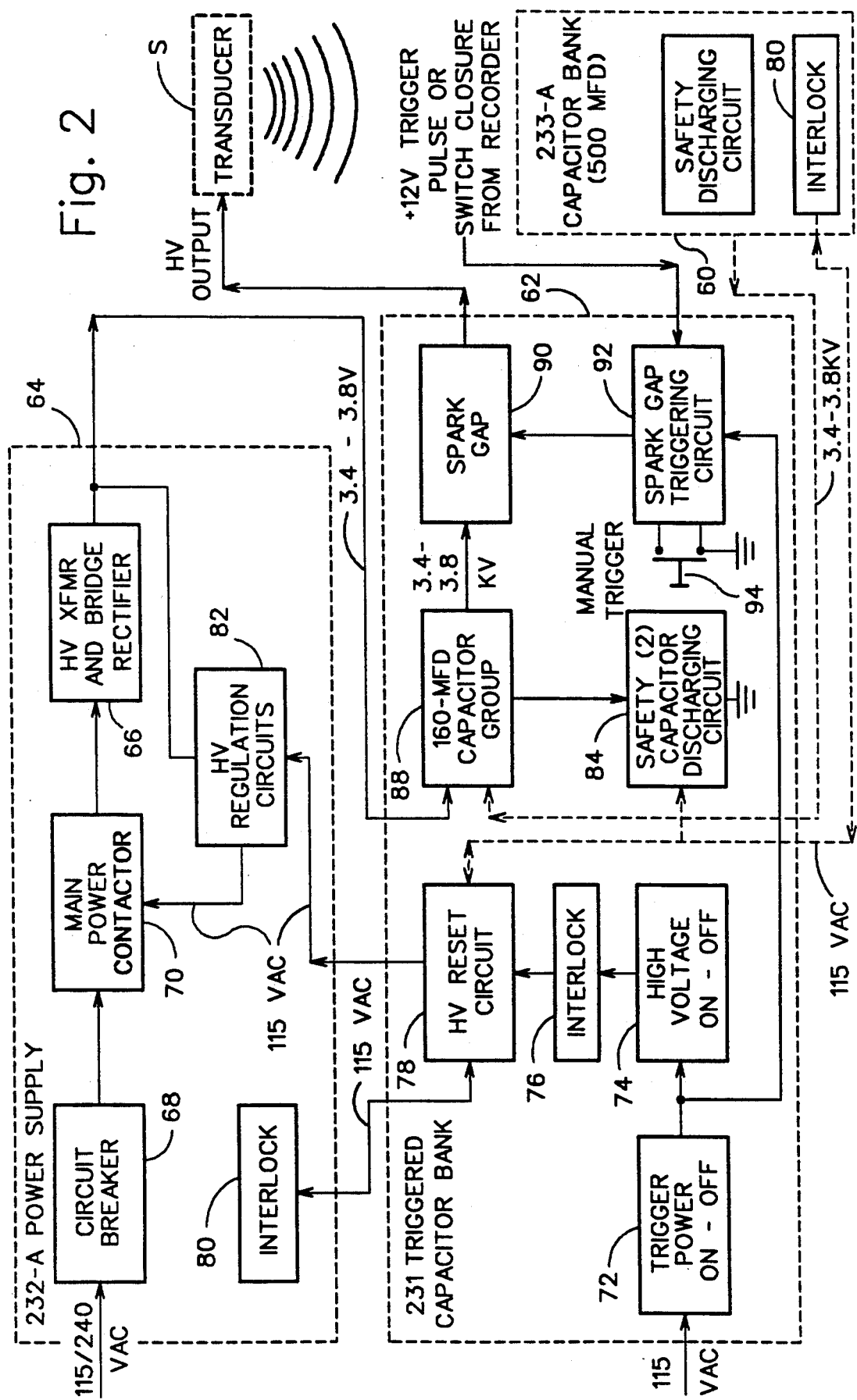
FIG. 2 is a schematic view of the electrical circuitry for the energy source.

As best shown in FIG. 2, energy source 58 includes a triggered capacitor bank 62 and a power supply 64. The power supply 64 is provided with 115/240 VAC power, while the triggered capacitor bank is provided with 115 VAC power.

Power supply 64 has a high voltage transformer 66 supplied with electrical power through circuit breaker 68 and main power contactor 70. The high-voltage output of transformer 66 (3.4 to 3.8 KV) is rectified by a diode bridge rectifier. When the trigger power switch 72 of the triggered capacitor bank 62 is turned on then 115 VAC powers interlock and control circuits, an SCR trigger circuit, and high voltage regulator circuits.

Trigger power switch 72 feeds high voltage on/off switch 74 which is connected to interlock 76 and high voltage reset circuit 78. Reset circuit 78 is connected to interlock 80 of the power supply 64 and also to the high voltage regulation circuits 82 of the source 64.

Reset circuit 78 is connected to the safety capacitor discharge circuit 84. In this way, the power source 58 has appropriate circuitry to make sure that its two principal components are in condition for firing when it is desired to send electrical energy to the source S. Capacitor group 88 is connected to the safety capacity discharge circuit 84 and to spark gap 90. Power switch 72 is connected with spark gap triggering circuit 92. A +12V trigger pulse input causes the spark gap triggering circuit 92 to control spark gap 90. Preferably, spark gap triggering circuit 92 has a manual trigger 94 to also permit manual operation of the energy source 58. Spark gap 90 is in electrical connection with source S, as noted, through the armored coaxial cable C.

We have found that the characteristics of the acoustic pressure pulse generated by the arc discharge process of source S are governed in part by the rate of vaporization of the conductive fluid within the source S. Heat generation is concentrated where the electrical field intensity, and consequently the electric current density, is at the maximum. Should the exposed surface of the central conductor 48 be small, rough, and pitted, then current flow will be strongly concentrated at the sharp points and splines on the surface 48. This results in desirable local, high electric field intensities. On the other hand, should the conducting surface 48 be relatively large and smooth, then the electric field intensities are relatively small, thereby reducing the potential for electrical discharge and generation of useful acoustic pressure. Efficient production of acoustic energy therefore suggests that the exposed surface of the anode 48 be limited to its cross-sectional area.

We have found that the insulator 46 of the cable C melts or recedes very little upon firing of the source S. With repeated firing during testing, however, the copper conductor 48 receded within the insulator 46. Eventually a longitudinal crack formed in the insulator 46, and this propagated upwardly at approximately the same speed as that at which the conductor 48 was consumed. This was an acceptable result, because the exposed surface of the conductor 48 was essentially limited to the cross-sectional area. A large portion of the insulator 46 may eventually spall upon repeated firing of the source S, thereby exposing the smooth side of the conductor 46. In that event, a significant loss of acoustic energy will be observed and the source S will have to be dismantled to trim the anode 48.

The energy source 58 provides power options of 100, 200, and 300 joules at 3,500 volts. When operated at 100 joules, the conductor 48 had to be trimmed after 35,000 to 50,000 firings. At 300 joules, however, trimming was required after 8,000–10,000 firings or arc generations. The cable C within the tube 10 had to be replaced after approximately 250,000 shots.

We found that the source S could be fired at a rate dependent upon the power option which was chosen, because of the need to charge the capacitors. The source S could be fired at 6 shots per sec. when powered to 100 joules, and this rate was reduced to 2 shots per sec. at 300 joules. These rates were used for data stacking at fixed source and receiver depth positions, and repeatability of the signal signature was excellent.

A wide-band hydrophone with a 32 db. downhole preamplifier was employed for sensing the seismic field. Signals were passed through a variable high-pass and a fixed low-pass filter. The anti-alias, low-pass filter was set at 7 kHz. Typically, the high-pass filter was set at either 300, 800, 1,000 or 1,200 Hz.

Data were stacked a minimum of 5 shots per record. Stacking of data proceeded under computer control until the stacked signal-to-noise ratio exceeded 35 db., or the stack number equaled 20, whichever occurred first. Concurrently, amplifier gain was also changed under computer control to ensure that the recorded signal was within 25 percent of the full dynamic range of the A/D converter. If the preamplified signal was not within this range, then it was rejected, the gain changed, and the process repeated. Each recorded signal was normalized by the amplifier gain prior to stacking, and the resulting stack normalized by number of stacked traces. As a consequence, consecutive traces in a seismic section were displayed in terms of true relative amplitudes from trace to trace. These data were digitized with a 16-bit A/D converter at a sample interval ranging from 10 to 50 $\mu$s.

Figure 3:
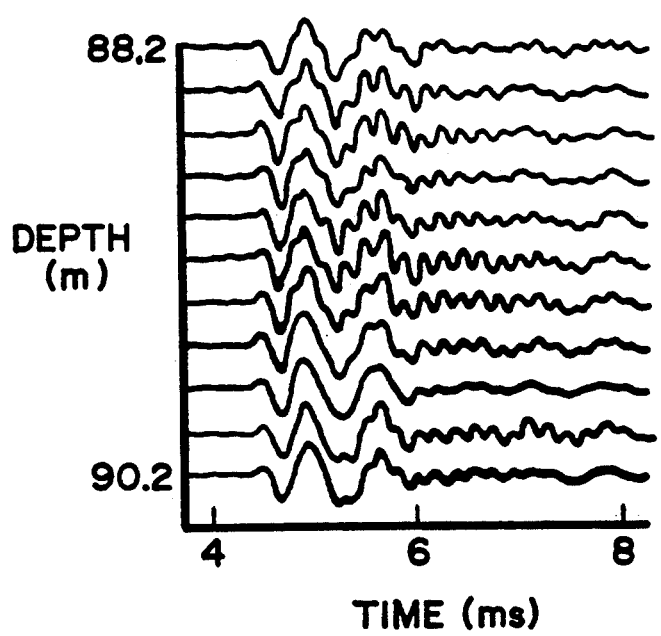
FIG. 3 is a chart showing zero-offset test data recorded in a geologic formation.

FIG. 3 discloses a subset of the zero-offset data recorded in the Igneous formation. These data were recorded in the 1.0 to 7.0 kHz. pass-band employing a 10 $\mu$s. sampling interval. Tube wave events were removed from the host data prior to selection of this subset. Otherwise, the test data depicted in FIG. 3 have not been subjected to any form of data processing.

Figure 4:
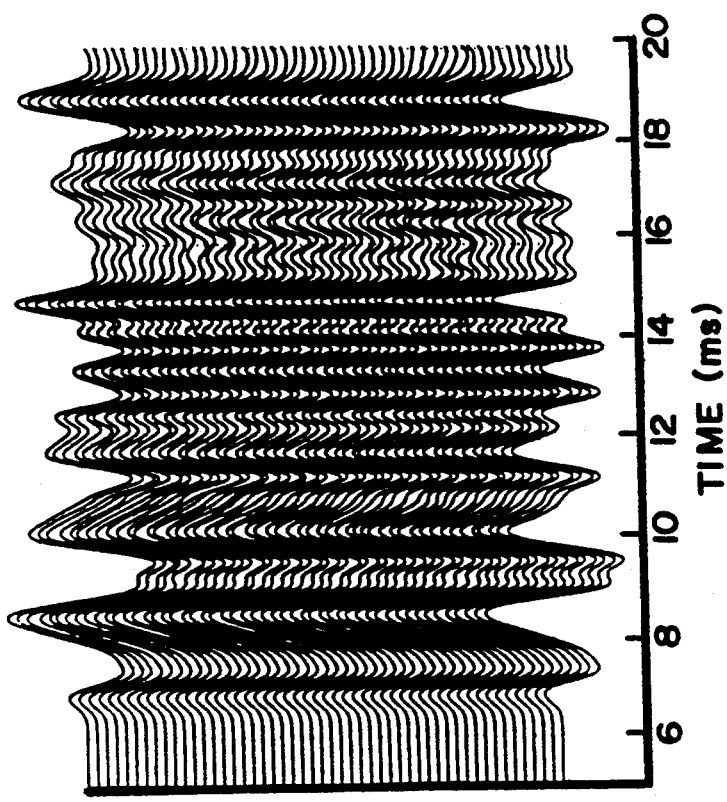
FIG. 4 is a chart showing shot repeatability test data of the device of FIG. 1.

In order to establish reliability of the strength and signature of sources, tests were conducted with the source S and a cooperating receiver fixed at the same depth within their respective boreholes and stacked signals from repeated shots were recorded. A typical record acquired in a sedimentary section in Rolla is shown in FIG. 4. Each recorded trace represents a stack of 5 shots. Data are presented with true relative amplitude from trace-to-trace.

Some minor variations in signal strength and waveform were observed in recorded signals for single shots. These variations occurred mainly in the frequency band above 2.5 kHz., which suggest that the mechanism for generation of these high-frequencies is not as repeatable as that for primary, lower frequency events. For a stack of only 5 shots, however, repeatability of both signal strength and waveform was excellent within the entire recording bandwidth.

To evaluate the range of the sources relative to horizontal borehole separation and operational depth, tests were conducted in a sedimentary environment. Twenty cm. diameter boreholes, steel cased to 428 m., were used for the experiment and the boreholes were spaced 98.9 m. apart.

Figure 5:
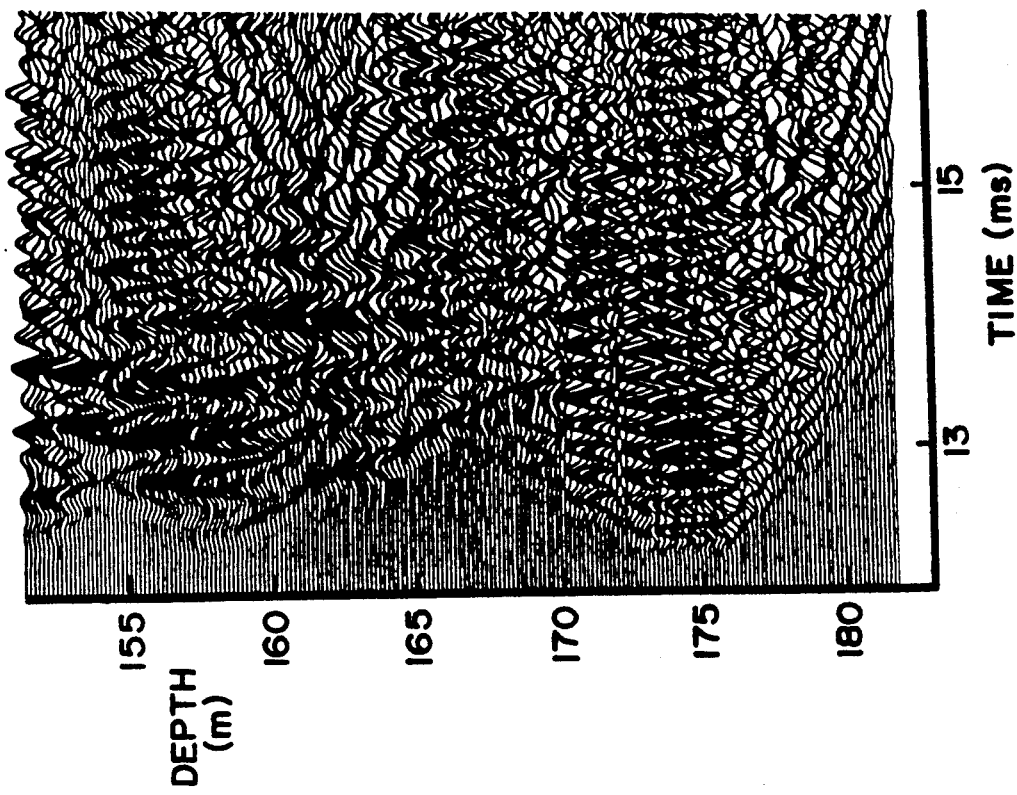
FIG. 5 is a chart showing zero vertical offset test data between the device of FIG. 1 and a receiver throughout a depth interval.

Data were band-passed between 1.2 and 7.0 kHz. for the test range, and were temporally sampled at an interval of 25 $\mu$s. and spatially sampled at an interval of 15.24 cm. Raw data recorded with zero vertical offset between source S and a receiver within a depth interval of 150 to 180 m. are shown in trace-normalized format in FIG. 5.

The stack number per trace, controlled by an automatic signal-to-noise algorithm, was not recorded during the acquisition process. Observations during the gathering of the data, however, noted that the number of stacks required to achieve a 35 db. signal-to-noise ratio was seldom above 12 and went to the full limit of 20 only about 10% of the time. This indicates that there was excellent energy transmission at this distance, particularly in view of the high recording bandwidth.

As observed in the Rolla data of FIG. 4, high speed layers result in a distinctive high-frequency ringing of channelling phenomenon. This ringing may be observed in the data of FIG. 5 at a depth of about 174 m. Refractions from high speed layers also comprised a significant portion of the first arrivals in this record.

A test to evaluate the variation of signal strength with vertical offset of source S and a cooperating receiver was also conducted in the sedimentary section of Rolla. The receiver was fixed at a depth of 91.0 m., and the source S was raised in 3 m. steps from a starting depth of 176 m. The recording bandwidth was set at 0.3 to 7.0 kHz., with a sampling interval of 50 $\mu$s. employed.

The source S, in all of its simplicity, is an effective source of repeatable seismic energy when used in a borehole environment. Among its more attractive features are its disposability, which eliminates the ever present concern of losing expensive tools in boreholes, performance insensitivity to construction parameters and electrolyte concentrations, operational longevity, and simplicity of maintenance.

The source S produces a highly repeatable seismic signal. The low-frequency, primary waveform is relatively insensitive to reasonable variations of host rock type. The source S was found to be effective at cross-borehole distances of 100 m. or more, useable to depths of at least 430 m., and at radiation angles in the vertical plane to 68°. The dominant frequency of the primary event is approximately 1.5 kHz., depending upon the source-receiver distance, with a half-power bandwidth exceeding 1.0 kHz. Consequently, the source S is a highly effective tool for the acquisition of tomographic data for purposes of delineating small, shallow targets of limited lateral extent.

While this invention has been described as having a preferred design, it is understood that the invention is capable of further modification, uses, and/or adaptations which follow in general the principle of the invention and including such departures from the present disclosure as come within known or customary practice in the art to which the invention pertains, and as may be applied to the central features hereinbefore set forth, and fall within the scope of the limits of the appended claims.

What we claim is:

1. An acoustic source for seismic exploration, comprising:
   a) a generally cylindrical tube having spaced upper and lower closed ends;
   b) an insulated continuous conductor having a first arc producing portion with an exposed internal conductive end within said tube and a second portion extending therefrom through said upper end;
   c) a selectively closeable port operably associated with said tube for permitting said tube to be filled and maintained filled with a conductive solution;
   d) a gas vent having a first open end within said tube adjacent said upper end and a second open end exteriorly disposed of said tube.

2. The source of claim 1, wherein:
   a) means are positioned within said tube and engaged with said first portion for maintaining said first portion in a predetermined orientation.

3. The source of claim 2, wherein:
   a) said first portion is centrally disposed within said tube, and said second portion extends centrally through said closed upper end.

4. The source of claim 1, wherein:
   a) said conductive end is adjacent said closed lower end.

5. The source of claim 4, wherein:
   a) said conductive end is positioned more than half the distance between said upper and lower ends.

6. The source of claim 1, wherein:
   a) said conductor is a multi-layer cable comprising a central conductive line surrounded by a plurality of auxiliary layers.

7. The source of claim 6, wherein:
   a) said line is comprised of copper, a first layer contacts said line and is an insulator, a second layer contacts said first layer and is a braided metal shield, and a third layer contacts said second layer and is a plastic cover.

8. The source of claim 7, wherein:
   a) each of said second and third layers is selectively stripped from said conductor for exposing a length of the underlying contacted layer.

9. The source of claim 7, wherein:
   a) said third layer has superposed thereon beyond said tube a metal mesh layer, and said metal mesh layer has superposed thereon a neoprene layer.

10. The source of claim 8, wherein:
    a) each of said exposed lengths is disposed within said tube, with said insulator layer extending from said conductive end.

11. The source of claim 1, wherein:
    a) said gas vent is a continuous resilient tube extending through said lower end.

12. The source of claim 1, wherein:
    a) said port is centrally positioned within said lower end, and said gas vent extends through said port.

13. The source of claim 1, wherein:
    a) said tube and said gas vent are each comprised of a resilient material.

14. A source for acoustic seismic exploration, comprising:
    a) a resilient cylindrical tube having closed upper and lower ends;
    b) a continuous coaxial cable having a first arc producing portion passing through said upper end and terminating in an exposed conductive end adjacent said lower end;
    c) a resilient vent tube having a first open end adjacent said upper end and a second open end disposed exteriorly of said cylindrical tube below said lower end;
    d) a conductive fluid filling said cylindrical tube; and
    e) means operably associated with said cable for supplying electrical energy thereto.

15. The source of claim 14, wherein:
    a) said cable passes centrally through said upper end; and
    b) means are operably engaged with said first portion for maintaining said first portion centrally positioned within said cylindrical tube.

16. The source of claim 14, wherein:
    a) said conductive fluid is a solution of water and a salt.

17. The source of claim 14, wherein:
    a) said vent tube has a first portion extending parallel to said cable first portion and a second portion extending through said lower end.

18. The source of claim 14, wherein:
    a) said cable has a plurality of layers, each of said layers being selectively stripped away in order to expose a desired amount of the immediately underlying layer.

19. The source of claim 18, wherein:
    a) that portion of said cable disposed exteriorly of said cylindrical tube has a wire mesh layer overlaid with a neoprene layer.

20. The source of claim 17, wherein:
    a) said lower end includes a selectively closeable port for filling and maintaining filled said cylindrical tube with said conductive fluid, and said vent tube second portion extends through said port.

* * * * *